(12) United States Patent
Chari et al.

(10) Patent No.: US 7,689,224 B2
(45) Date of Patent: Mar. 30, 2010

(54) METHOD AND APPARATUS TO PROVIDE A ROUTING PROTOCOL FOR WIRELESS DEVICES

(75) Inventors: Amalavoyal Narasimha Chari, Belmont, CA (US); Devabhaktuni Srikrishna, Somerville, MA (US)

(73) Assignee: Tropos Networks, Inc., San Mateo, CA (US)

( * ) Notice: Subject to any disclaimer, the term of this patent is extended or adjusted under 35 U.S.C. 154(b) by 1456 days.

(21) Appl. No.: 10/754,978

(22) Filed: Jan. 9, 2004

(65) Prior Publication Data

US 2004/0143678 A1  Jul. 22, 2004

Related U.S. Application Data

(62) Division of application No. 09/751,262, filed on Dec. 29, 2000, now Pat. No. 6,704,301.

(51) Int. Cl.
*H04Q 7/20* (2006.01)
*H04L 12/28* (2006.01)

(52) U.S. Cl. .................... 455/445; 455/463; 455/452.1; 709/227

(58) Field of Classification Search ................. 455/445, 455/463, 454, 452, 453; 370/351, 254, 255, 370/238, 400, 338, 331; 709/227
See application file for complete search history.

(56) References Cited

U.S. PATENT DOCUMENTS

| | | | |
|---|---|---|---|
| 4,387,466 A | | 6/1983 | Sire |
| 5,007,052 A | | 4/1991 | Flammer |
| 5,212,806 A | * | 5/1993 | Natarajan .................... 455/525 |
| 5,471,469 A | | 11/1995 | Flammer, III et al. |
| 5,515,509 A | * | 5/1996 | Rom .......................... 709/228 |
| 5,563,881 A | * | 10/1996 | Perelman et al. ............. 370/428 |
| 5,636,220 A | | 6/1997 | Vook et al. |
| 5,654,959 A | * | 8/1997 | Baker et al. .................. 370/331 |
| 5,684,800 A | | 11/1997 | Dobbins et al. |
| 5,740,366 A | * | 4/1998 | Mahany et al. ............... 709/227 |
| 5,812,531 A | * | 9/1998 | Cheung et al. ............... 370/255 |
| 5,818,820 A | | 10/1998 | Anderson et al. |
| 5,883,884 A | | 3/1999 | Atkinson |

(Continued)

FOREIGN PATENT DOCUMENTS

WO    WO 02/054646 A2    7/2002

OTHER PUBLICATIONS

Bellur et al., "A REliableEfficient Broadcast Protocol for Dynamic Networks", IEEE Infocom '99. Eighteenth Annual Joint Conference of the IEEE Computer & Communications Societies. Proceedings, NY, Mar. 1999. vol. 1, pp. 178-186.*

(Continued)

*Primary Examiner*—Melur Ramakrishnaiah
(74) *Attorney, Agent, or Firm*—Blakely, Sokoloff, Taylor & Zafman, LLP; Judith A. Szepesi

(57) ABSTRACT

A method and apparatus for generating connectivity is described. The method includes a server broadcasting a beacon including the server's address. The method further includes each client that receives the beacon rebroadcasting the beacon. The result is that each client receiving the beacon knows a way to reach the server.

17 Claims, 15 Drawing Sheets

U.S. PATENT DOCUMENTS

| | | | |
|---|---|---|---|
| 5,901,362 A | | 5/1999 | Cheung et al. |
| 5,943,322 A | | 8/1999 | Mayor et al. |
| 5,987,062 A | * | 11/1999 | Engwer et al. ............. 375/225 |
| 6,044,062 A | | 3/2000 | Brownrigg et al. |
| 6,046,992 A | | 4/2000 | Meier et al. |
| 6,097,703 A | | 8/2000 | Larsen et al. |
| 6,104,712 A | | 8/2000 | Robert et al. |
| 6,134,231 A | | 10/2000 | Wright |
| 6,173,191 B1 | | 1/2001 | Jennings, III |
| 6,342,844 B1 | | 1/2002 | Rozin |
| 6,418,138 B1 | * | 7/2002 | Cerf et al. ................... 370/352 |
| 6,418,299 B1 | | 7/2002 | Ramanathan |
| 6,421,731 B1 | * | 7/2002 | Ciotti et al. ................ 709/238 |
| 6,449,484 B1 | | 9/2002 | Grubeck et al. |
| 6,456,599 B1 | * | 9/2002 | Elliott ........................ 370/254 |
| 6,493,759 B1 | * | 12/2002 | Passman et al. ............ 709/227 |
| 6,498,934 B1 | | 12/2002 | Muller |
| 6,564,074 B2 | * | 5/2003 | Romans ...................... 455/574 |
| 6,611,509 B1 | | 8/2003 | Hayashi et al. |
| 6,647,002 B1 | | 11/2003 | Suda et al. |
| 6,687,239 B1 | | 2/2004 | Koprivica |
| 6,694,141 B1 | | 2/2004 | Pulkkinen et al. |
| 6,704,301 B2 | | 3/2004 | Chari et al. |
| 6,721,306 B1 | * | 4/2004 | Farris et al. ................. 370/352 |
| 6,798,765 B2 | | 9/2004 | Larsson |
| 6,865,185 B1 | | 3/2005 | Patel et al. |
| 6,907,257 B1 | | 6/2005 | Mizutani et al. |
| 2001/0030969 A1 | | 10/2001 | Donaghey et al. |
| 2002/0016926 A1 | | 2/2002 | Nguyen et al. |

OTHER PUBLICATIONS

Bagni et al., Location Aware One-toMany Communication in Mobile Multi-hop Wireless Networks, 2000 IEEE 51st Vehicular Technology Conference Proceedings, VTC 2000-Spring, Tokyo, May 2000, vol. 1, pp. 288-292.*

Mosko et al., "A Self-correcting Neighbor Protocol for Mobile Ad-hoc Wirelss Networks",Proceedings of Eleventh International Conference on Computer communications & Networks, Oct. 2002, pp. 556-560.*

"A Review of Current Routing Protocols for Ad Hoc Mobile Wireless Networks," By Roger and Toh found on www.ee.survey.ac.uk/personal/g.aggelou/papers/adhoc review.pdt, also in IEEE communications, Apr. 1999.

"Hierarchical Network Routing (a different perspective on achieving scalability through setting up hierarchies in the address space), found on www.cs.su.oz.au/~piers/papers/routing/routing/html: L. Kleinrock and F. Kamounds Hierarchical routing for large networks" 1977.

"Think more than wired," found on www.nwr.nokia.com.

"Ricochet," found on www.metricom.com.

"Mesh— you are the network," found on www.meshnetworks.com.

"Turbowave—the future is yours to imagine," found on www.turbowave.com.

"Nova Engineering," found on www.novaroam.com.

S. Corson, J. Macker, Mobile Ad hoc Networking (MANET), The Internet Society, Jan. 1999, found on www.ietf.org/rfc/rfc2501.txt, 12 pages.

IEEE Standard for Information Technology-No. 802.1d, 1998 Edition, "Part 3 Media Access Control (MAC) Bridges,": Found on http://standards.ieee.org/reading/ieee/std/lanman/802.1D-1998.pdf, and adopted by the ISO/IEC and redesignated as ISO/IEC 15802-3: 1998, 373 pages.

IEEE Draft 802.1w /D10, "Part 3 Media Access Control (MAC) Bridges, Amendment 2—Rapid Reconfiguration," abstract found on http://www.drizzle.com/~aboba/IEEE/802-1w-d10.pdf, adopted by the ISO/IEC and redesignated ISO/IEC 15802-3:1998. 163 pages.

K. Grace, "Mobile Mesh Routing Protocol," Sep. 22, 2000, Internet Draft from the IETF Manet Working Group found on .http://www.mitre.org/tech_transfer/mobilemesh, 8 pages.

E.M. Royer and C-K. Toh, "A Review of Current Routing Protocols for Ad-Hoc Mobile Networks," IEEE Personal Communications, Apr. 1999. pp. 46-55.

L.M. Feeney, "A Taxonomy for Routing Protocols in Mobile Ad Hoc_Networks," Swedish Institute of Computer Science, SICS Technical Report T99/07, Oct. 1999, 20 pages.

"Providing Solutions For Mobile Adhoc Networking," Web product brochure downloaded from www.mobilemesh.com on Mar. 26, 2002, 8 pages.

International Search Report dated Dec. 12, 2001.

Bellur, et al., "A ReliableEfficient Broadcast Protocol for Dynamic Networks," IEEE Infocom '99. Eighteenth Annual Joint Conference of the IEEE Computer & Communications Societies. Proceedings, NY, Mar. 1999, vol. 1, pp. 178-186.

Bagni, et al., Location Aware One-toMany Communication in Mobile Multi-hop Wireless Networks, 2000 IEEE $51^{st}$ Vehicular Technology Conference Proceedings, VTC 2000-Spring, Tokyo, May 2000, vol. 1 pp. 288-292.

Mosko, et al., "A Self-correcting Neighbor Protocol for Mobile Ad-hoc Wireless Networks," Proceedings of Eleventh International Conference on Computer communications & Networks, Oct. 2002, pp. 556-560.

"A Review of Current Routing Protocols for Ad Hoc Mobile Wireless Networks," By Roger and Toh found on www.ee.surrey.ac.uk/personal/g.aggelou/papers/adhoc review.pdf, also in IEEE communications, Apr. 1999.

"Hierarchical Network Routing (a different perspective on achieving scalability through setting up hierarchies in the address space); found on www.cs.su.oz.au/ ~piers/papers/routing/routing/html: L. Kleinrock and F. Kamounds Hierarchical routing for large networks" 1977.

"Think more than wired," found on www.nwr.nokia.com.

"Ricochet," found on www.metricom.com.

"Mesh—you are the network," found on www.meshnetworks.com.

"Turbowave—the future is yours to imagine," found on www.turbowave.com.

"Nova Engineering," found on www.novaroam.com.

S. Corson, J. Macker, Mobile Ad hoc Networking (MANET), The Internet Society, Jan. 1999, found on www.ietf.org/rfc/rfc2501.txt, 12 pages.

IEEE Standard for Information Technology —Number 802.1d, 1998 Edition, "Part 3 Media Access Control (MAC) Bridges," Found on http://—/standards.ieee.org/reading/ieee/std/lanman/802.1D-1998. pdf, and adopted by the ISO/IEC and redesignated as ISO/IEC 15802-3: 1998, 373 pages.

IEEE Draft 802.1w /D10, "Part 3 Media Access Control (MAC) Bridges, Amendment 2—Rapid Reconfiguration," abstract found on http://www.drizzle.com/~aboba/IEEE/802-1w-d10.pdf, adopted by the ISO/IEC and redesignated ISO/IEC 15802-3:1998, 163 pages.

K. Grace, "Mobile Mesh Routing Protocol," Sep. 22, 2000, Internet Draft from the IETF Manet Working Group found on .http://www.mitre.org/tech_transfer/mobilemesh, 8 pages.

E.M. Royer and C-K. Toh, "A Review of Current Routing Protocols for Ad-Hoc Mobile Networks," IEEE Personal Communications, Apr. 1999, pp. 46-55.

L.M. Feeney, "A Taxonomy for Routing Protocols in Mobile Ad Hoc_Networks," Swedish Institute of Computer Science, SICS Technical Report T99/07, Oct. 1999, 20 pages.

"Providing Solutions For Mobile Adhoc Networking," Web product brochure downloaded from www.mobilemesh.com on Mar. 26, 2002, 8 pages.

International Search Report dated Dec. 12, 2002.

Supplementary European Search Report, EP Application No. 01991056, 3 pages.

Toh, C-K, et al, "ABAM: On-Demand Associativity-Based Multicast Routing for Ad Hoc Mobile Networks," Vehicular Technology Conference, IEEE, vol. 3, Sep. 24, 2000, pp. 987-993.

Tschudin, Christian, et al, "Active Routing for Ad Hoc Networks," IEEE Communications Magazine, vol. 38, No. 4, Apr. 1, 2000, pp. 122-127.

Supplemental European Search Report for EP 01991540.4, mailed Jul. 10, 2009, 5 pages.

PCT Notification of Transmittal of the International Search Report or the Declaration for PCT/US01/50272, mailed Apr. 8, 2002, 5 pages.
PCT Notification of Transmittal of International Preliminary Examination Report for PCT/US01/48215, mailed Apr. 28, 2004, 7 pages.
PCT Notification of Transmittal of International Preliminary Examination Report for PCT/US01/50272, mailed Apr. 15, 2003, 6 pages.
PCT Written Opinion for PCT/US01/48215, mailed Jul. 25, 2003, 6 pages.
PCT Written Opinion for PCT/US01/50272, mailed Dec. 18, 2002, 5 pages.

* cited by examiner

METHOD AND APPARATUS TO PROVIDE A ROUTING PROTOCOL FOR WIRELESS DEVICES

The present patent application is a Divisional of application Ser. No. 09/751,262, filed Dec. 29, 2000 now U.S. Pat. No. 6,704,301.

FIELD OF THE INVENTION

This invention is concerned with the area of wireless systems, and more particularly with routing data between a server and a client in a wireless environment.

BACKGROUND

The use of wireless devices to access the Internet is becoming more prevalent. However, accessing the data generally requires either intelligent clients, or high bandwidth as the size of the network expands.

One prior art protocol that is used is the SURAN class of protocols, developed under the aegis of DARPA. This set of algorithms comprises hierarchical as well as non-hierarchical algorithms. The non-hierarchical algorithms lack scalability—as the size of the network grows (N=number of nodes in the network), the bandwidth needed to perform routing grows like N or N^2. This means that for a given required data communications bandwidth, the possible size of the network is heavily constrained. Hierarchic algorithms are complex, difficult to implement, have overheads associated with the establishment and maintenance of hierarchies, and suffer from management costs associated with network monitoring, route-maintenance, tracking and addressing of roaming nodes, etc.

Another prior art set of protocols is the MANET suite of protocols, which was developed within the IETF. The MANET suite of protocols makes inefficient use of bandwidth.

One prior art mechanism, illustrated in FIG. 1, requires each client A-E 110-150 to maintain a full tree 125, to access each client and each server to which the client 120 can gain access. This is disadvantageous because it requires a large memory, which expands as the network expands.

Therefore, a better protocol for interconnecting a wireless network would be advantageous.

SUMMARY

It is an object of this invention to provide an improved wireless protocol.

A method and apparatus for generating connectivity is described. The method includes a server broadcasting a beacon including the server's address. The method further includes each client that receives the beacon rebroadcasting the beacon. The result is that each client receiving the beacon knows a way to reach the server.

Other features and advantages of the present invention will be apparent from the accompanying drawings, and from the detailed description, which follows below.

BRIEF DESCRIPTION OF THE DRAWINGS

The present invention is illustrated by way of example and not limited by the figures of the accompanying drawings in which like references indicate similar elements and in which.

DETAILED DESCRIPTION

Overview

The present invention provides a scalable routing solution that uses bandwidth efficiently, adapts quickly to changes in network topology and connectivity, is self-administering, easily deployable, automatically partitions the network in order to optimally exploit available wired connections and is easy to implement. The network architecture includes one or more wired-access points (Servers), which are simultaneously members of the wireless network and the (wired) Internet, and a large number of Clients that are members of the wireless network and have access to the wired Internet only through the Servers. For one embodiment, the number of Servers will be limited (perhaps 1 Server for every 100 Clients) and the Clients will wish to gain access to a Server that will provide them with Internet access, email, etc. This system also permits, for one embodiment, client-to-client communication.

The server periodically sends out a beacon to the clients, who rebroadcast the beacon. This permits each client to determine its path to the server. For one embodiment, a reverse beacon is sent by the clients, to the server. Thus, the server has a full path to each client, and each client has a path to its nearest neighbors, and knows which of those paths leads to the server. Therefore, the client and server can communicate. For one embodiment, if a client wishes to connect to the Internet via the server, it sends a request to the next client upstream from it, its request asking that it be passed along to the server. The server is able to send a message to any client as well.

For another embodiment, when a client wishes to connect the server, it sends a connection request, through the known path to the server. This connection request includes the known path to the server. When the server receives the request, it becomes aware of the path to the requesting client, as well as all intervening nodes. The server uses this information to respond to the request, and add the data to its routing table/client tree.

In this system, each client elects to be part of a separate set of clients served by a single server. These sets of clients are referred to as Clusters. Thus, the network automatically partitions itself into multiple Clusters, one for each server. This is advantageous, since each server need only address a subset of the clients. This optimizes server capacity among the clusters, and decreases response delay experienced by the clients.

Figure 1:
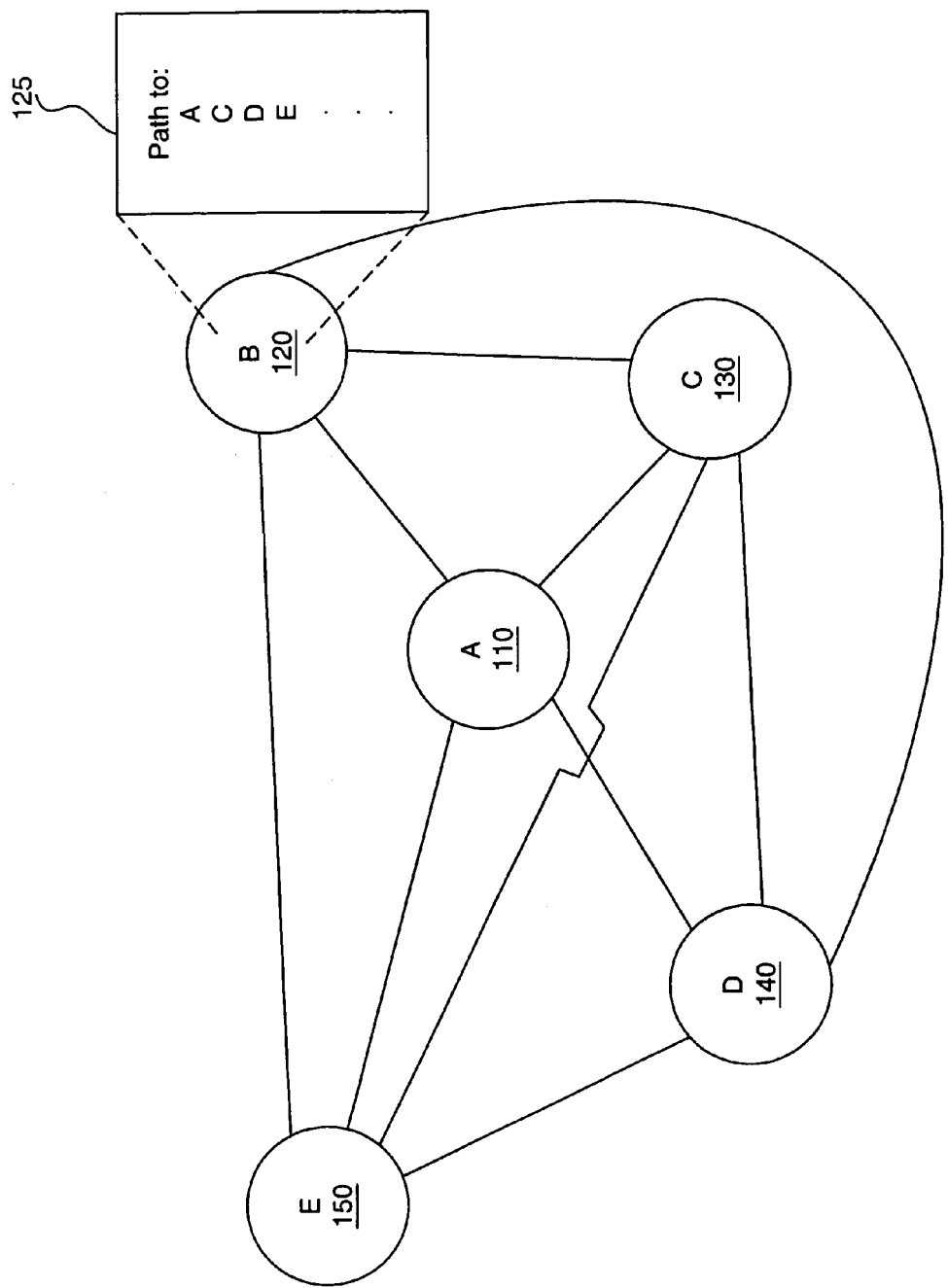
FIG. 1 is a block diagram of a prior art network of wireless connections.
Figure 2:
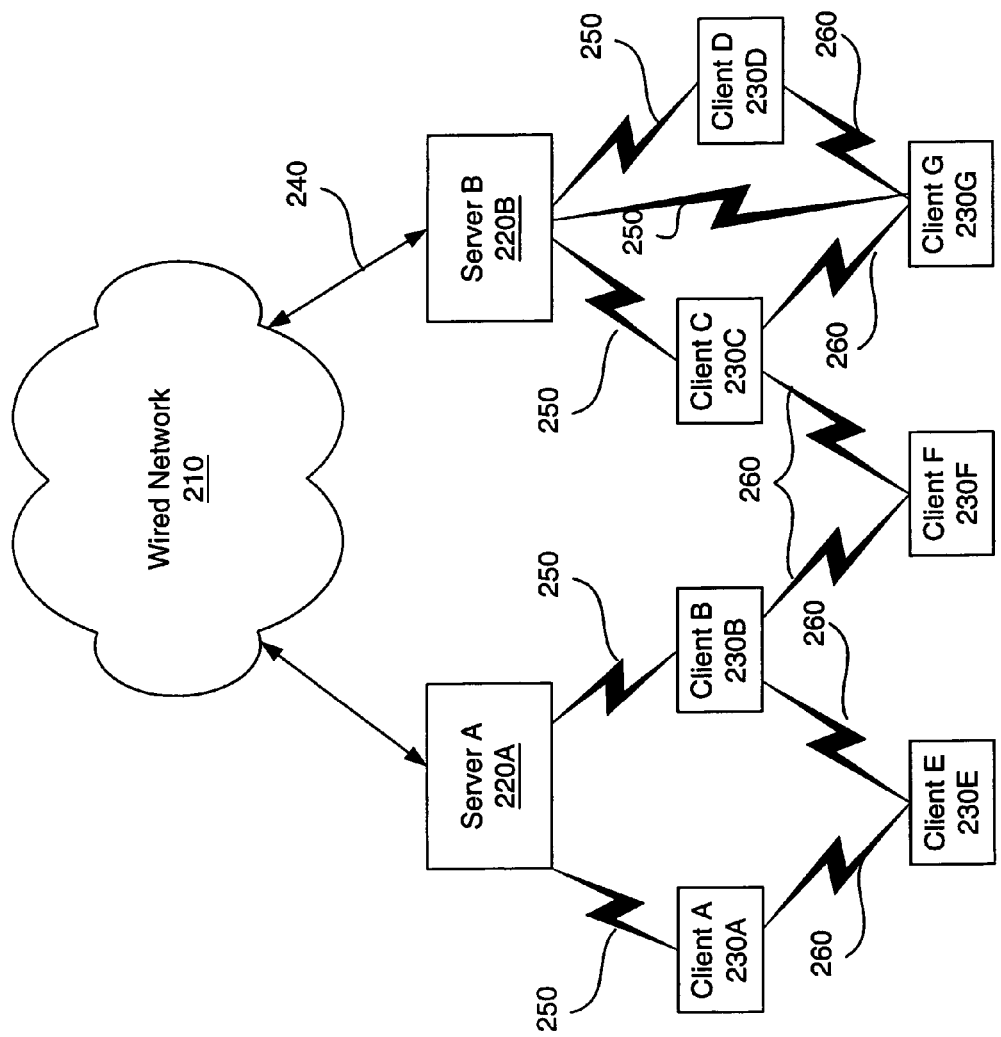
FIG. 2 is a network diagram of one embodiment of the current connection structure.

FIG. 2 is a network diagram of one embodiment of the current connection structure. The wired network 210, for one embodiment is the Internet. Servers 220A, 220B are coupled to the wired network 210, through a wired connection 240, for one embodiment. Alternatively, the servers 220A, 220B may be coupled to the network 210 via another type of high bandwidth connection.

Clients 230A-230E are coupled to the servers 220A-B, either directly or indirectly, through connections 250, 260. For one embodiment, connections 250, 260 are wireless connections. For another embodiment, the connections may be wired connections, or other types of connections. For one embodiment, there are a certain number of first level clients 230, which are coupled directly 250 to servers 220. Other clients 230 are coupled to the server 220 through one or more intermediate clients.

When a server 220 broadcasts a beacon, it is received by all first-level clients. The beacon is used to establish a route from each client to the server. First level clients are defined by the fact that they receive data directly from the server. The first level clients re-broadcast the beacon data, attaching their own data to it. This indicates to the second level clients that the path to the server includes the first level client. This will be described in more detail below.

For one embodiment, the link quality of the beacon received determines whether that beacon is rebroadcast by the system. If the quality of the beacon is good, it is rebroadcast. Otherwise, it is not. For one embodiment, link quality is determined by persistence, i.e. the number of times in the last several routing cycles that the particular beacon was received. For one embodiment, the link quality—reliability that a path to the server shown by the beacon will be available for a reasonable time—is built up as the beacon is received in every cycle. Whenever the beacon is not received in a cycle, the link quality associated with that path is decreased. The beacon is only transmitted if its link quality is sufficiently high.

For another embodiment, the depth of re-broadcast is determined for the system. Thus, for example, a client may rebroadcast a beacon only if there are 5 or fewer hops between the client and the server. For another embodiment, other link quality factors, such as traffic congestion, battery status of upstream clients, thickness of the pipeline, backend (i.e. server) capacity, latency, or other factors may be used to determine whether the beacon should be rebroadcast.

After a beacon is received by every client, every client has the address of an upstream client, which leads to the server. For one embodiment, each client also has a path to the server. A reverse beacon is then sent out through the clients, up to the server. The reverse beacon permits the server to establish a full client tree, enabling the server to access all clients. Furthermore, the reverse beacon informs each client what downstream nodes access the server through this client.

Each client has at least one upstream node, and may have a plurality of downstream nodes. Upstream nodes are the nodes that are between the client and the server. For a Level One client, there is only one upstream node, the server. For a Level Four client, there are four upstream nodes, which define the client's path to the server. Downstream nodes are nodes that receive the beacon from a particular client, and define their path to the server through that client. Thus, for example, in a single branch that is: Server-A-B-C-D-E-F-G, for client D, the upstream nodes are C, B, A, Server, while the downstream nodes are E, F, and G.

For another embodiment, the reverse beacon need not be sent. Not sending the reverse beacon means that the server can not initiate sending a message to a client. Rather, the server must wait for a request from the client. That request includes a path to the client. Also, the only method of client-to-client communication in such a system is by sending the message through the server. In some wireless systems this is sufficient because access to the server—which provides access to the general Internet—is the primary use.

Although only a limited number of servers 220 and clients 230 are shown in FIG. 2, it should be understood by one skilled in the art that an almost unlimited numbers of clients 220, at almost unlimited number of hops from the servers 220 may be implemented, within the scope of this patent. For one embodiment, the server capacity determines the number of clients that may be coupled to the server. Thus, for example, if the server can handle 10 simultaneous connections to various clients, then up to 100 clients may be coupled to the server. This indicates that no more than 1-in-10 clients access the server at any one time. This assures that the clients never have to wait for the server. Depending on the latency that is acceptable, which varies by function (e.g. voice v. data latency), the server may support a certain number of clients of each function.

Figure 3A:
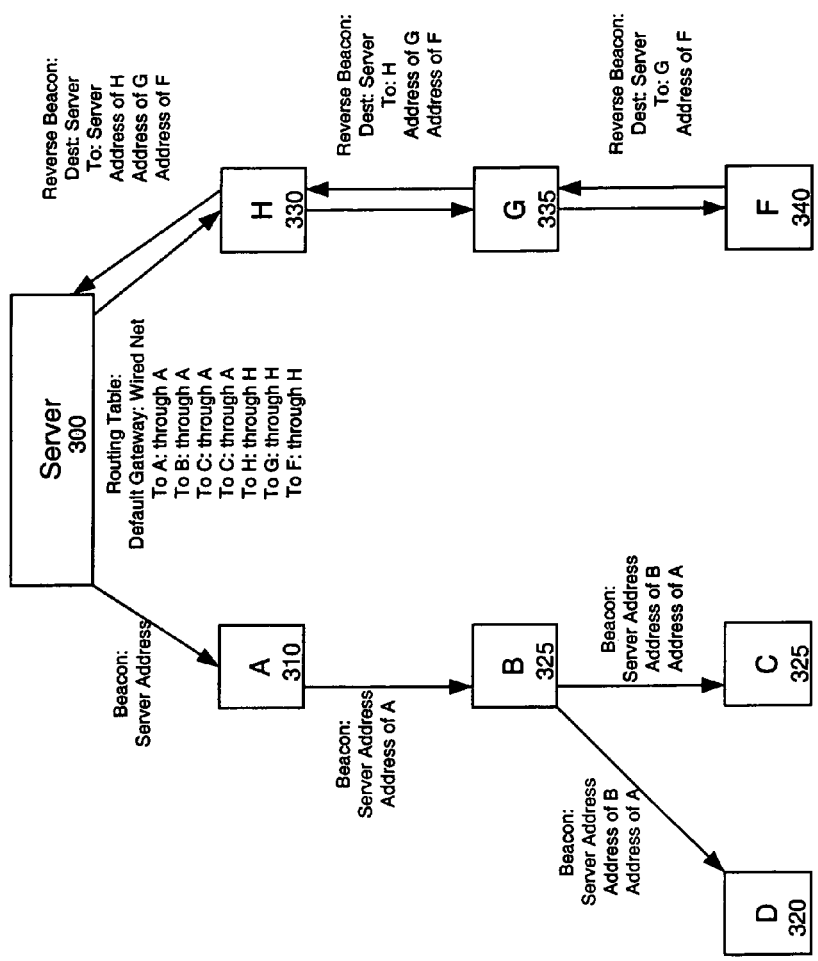
FIG. 3A is a network diagram of another embodiment of the current connection structure.
Figure 3B:
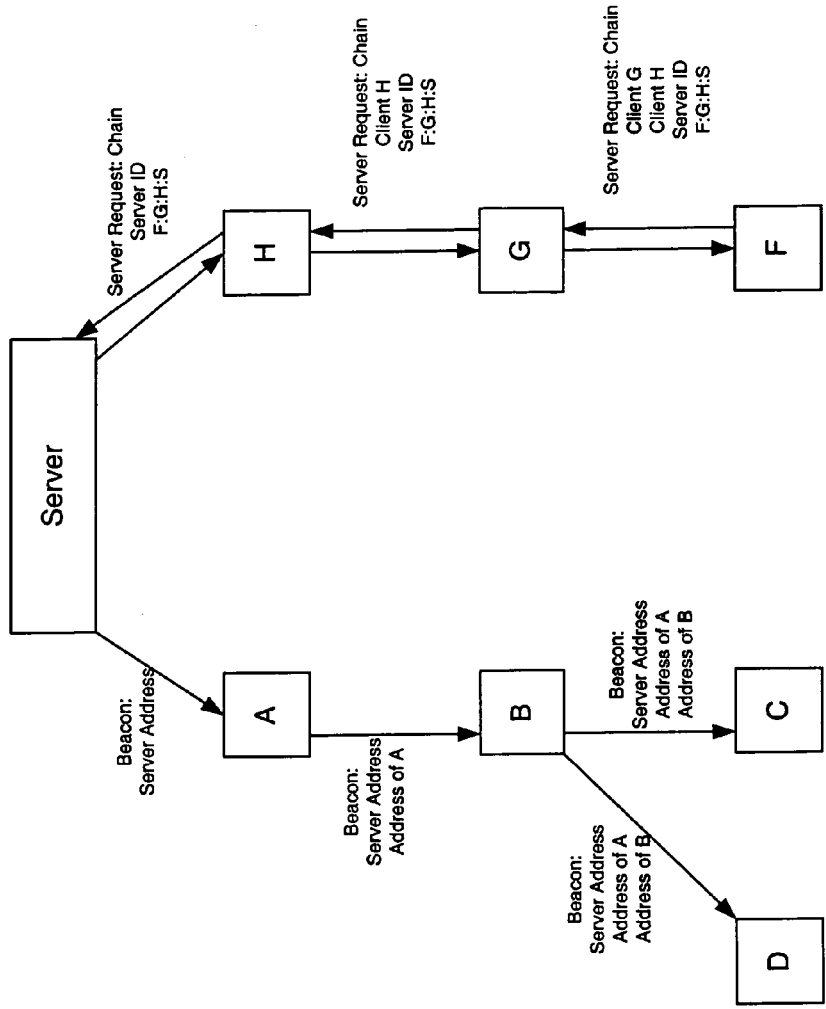
FIG. 3B is a network diagram of another embodiment of the current connection structure.

FIGS. 3A and 3B are network diagrams of two embodiments of the current connection structure. FIG. 3 shows a single server, and the set of messages sent as a beacon, as well as for a request.

The Server plays a central role in the discovery of routes by the Clients. At periodic intervals, the Server originates a "Beacon" which is broadcast to all Clients within hearing range of the Server. The time interval between successive broadcasts of the Beacon defines a routing cycle. The Beacon is a routing packet—a short data packet that contains the address of the server. For one embodiment, the Beacon includes the following information: (1) a sequence number which identifies which routing cycle it initiates, 2) the address (MAC or IP) of the Server, 3) a Traffic Monitoring Code (TMC). The use of the TMC will be described in more detail below. For one embodiment the TMC may be omitted. For one embodiment, the address of the Server may be included only in the Ethernet header or IP header of the beacon message.

For one embodiment, the Server may add a hop-count counter set to 0. This hop counter is incremented by each client that rebroadcasts the beacon. This permits the receiving client to determine how many hops from the server it is.

For one embodiment, the Beacon may contain only the sequence number of the message. All other relevant information may be captured in the Ethernet-level header and/or IP headers of the message.

The Beacon is received by all Clients within direct hearing range of the Server. For one embodiment, in FIG. 3A, this is shown as clients A 310 and H 330. For one embodiment, there is a means to ensure that the broadcast transmission is received. This will be discussed in more detail below. All such Clients 310, 330, which are one hop from the Server, are referred to as being at Level One with respect to the Server 300.

On receipt of the Beacon, each Level One Client 310, 330 has a path to connect to the server 300. For one embodiment, each of the Level One clients 310, 330 has the following data: (1) its connectivity to the Server, (2) a means to gain access to the Server (since it now knows the address of the Server and can direct transmissions to it), 3) the TMC of the Server. After a small delay, each Level One client 310, 330 rebroadcasts the Beacon, after appending to the Beacon its own address and TMC. For one embodiment, the delay is a random delay, such that not all Level One Clients broadcast at the same time. For one embodiment, the TMC data may be omitted. For one embodiment, the client may only increment a hop-count counter of the received beacon before rebroadcasting it. For another embodiment, the client may rebroadcast the Beacon unaltered.

For one embodiment, the rebroadcast Beacon now contains (1) the sequence number, (2) the address of the server and its TMC, (2) the address of the Level One Client and its TMC. Alternatively, the beacon may only include a hop-count, and/or a sequence number.

This Beacon is now received by all Clients that are two hops from the Server (Level Two Clients) 330, 360. On receipt of the Beacon, each Level Two Client 315, 335 now knows, for one embodiment, (1) that it has connectivity to the Server, (2) an explicit route to the next upstream client (the Level One Client whose broadcast it received), 3) the full path to the server through the upstream Level One Client and 4) the TMCs of the Server and the Level One Client from whom the broadcast was received. For one embodiment, each Level Two Client now knows (1) that it has connectivity to the Server and (2) an explicit route to the next upstream client. For one embodiment, each Level Two Client knows the number of hops to the Server 300 through the next upstream client.

It may happen that a Level Two Client 315, 335 may receive Beacon rebroadcast from two or more Level One Clients. In this case, it will select one of the two proffered routes, and reject the other(s). For one embodiment, the route that has the best link quality is selected. As described above, the link quality, for one embodiment, includes the persistence of the beacon. For one embodiment, it may further include other link quality factors. For another embodiment, the route selected will be the one corresponding to the first heard rebroadcast, so that this scheme may be named 'First-Heard Path Routing'. In another embodiment, described in more detail below, the TMC may be used to evaluate expected latency, and the path with the lowest latency may be selected.

It may also happen that one of the Level One Clients (say A) 310 may receive the broadcast of one of the other Level One Clients (say H) 330. Client A 310, because it is at Level One, already knows a route to the server. On examining the sequence number of the transmission it receives from H 330, it knows to ignore this routing update, as it already has a current route with that sequence number.

Each Client at Level Two now rebroadcasts the Beacon. For one embodiment, it rebroadcasts the Beacon after having appended its address and TMC to the Beacon. For one embodiment, it rebroadcasts the Beacon after having incremented the hop-count of the path back to the Server. For another embodiment, it rebroadcasts the Beacon unaltered. As discussed above, this optimal path or optimal Beacon may be selected based on link quality, priority in receiving the beacon, or based on another evaluation. By iteration of this process at each Level, each Client that has connectivity to the Server (i.e., that can link to the server through functional links potentially mediated by other Clients) becomes aware of its own connectivity to the server. For one embodiment, each Client knows a complete path to the Server. For another embodiment, each Client knows only the next upstream Client on way to the Server.

For one embodiment, the clients only rebroadcast the beacons up to a specified Level. Thus, for example, a client that has more than ten hops to the server would not rebroadcast. In this instance, if a client is outside of the acceptable latency range of a server, it may not receive a path to the server. This may be indicated to the user, such that the user can either use an alternative means, or move the client. Since these systems are for wireless broadcast, this is the equivalent of being out of range. A mobile device may be moved back into range. Since the beacons are rebroadcast periodically, the next time that the wireless device is within range of a Beacon, it would again receive a path to the server.

For one embodiment, each Client stores its discovered path to the Server in a temporary memory. For one embodiment, each Client only stores the address of its default gateway, the next upstream Client, in memory.

When the reverse beacon is received, the client further learns all of the downstream clients whose routes to the server pass through this particular client. For one embodiment, the client also stores this information. For one embodiment the upstream and downstream paths are stored in a temporary memory. For one embodiment, the temporary memory is a route table. For another embodiment, the temporary memory may be a cache. It is to be noted that the size of the temporary memory is of the order of the number of clients connected to a particular client downstream, and the data of the upstream client which leads the client to the server. For another embodiment, the data in the memory is the actual path to the server, and the size of the memory is of the order of the length of the path to the server (number of hops to the Server). This is very small compared with traditional distance-vector protocols, link-state protocols, or their variants where the length of the routing table is of the order of the number of nodes (Clients) in the network. For instance, assuming a uniform density of nodes, the size of the path that needs to be stored in a Client's memory is of the order of the square root of N, where N is the number of nodes.

The above-described method illustrates how nodes in the network (Clients) receive up-to-date information about their connectivity to the Server and a means to reach the Server.

In the system of FIG. 3A, a reverse beacon is used to permit the server to receive data to set up a full (two-way) routing path. For one embodiment, the reverse beacon is sent when the server sends a dummy reverse beacon, initiating it. For another embodiment, the reverse beacon is initiated when the client wishes to initiate communication with the server.

In one embodiment, the client, in response to the dummy reverse beacon, when it wishes to initiate communication, or upon receiving the beacon, initiates a downstream route setup procedure (DRS). The DRS will request that the server setup routes in its own routing table. The client node initiates a downstream route setup packet, for one embodiment, to its default gateway, asking it to forward the packet to the server. The default gateway is the next upstream node from the client. The default gateway for a Level One client is the server. The default gateway is the next upstream Client that the client uses to communicate with the server. It can be reset every time a beacon is received.

The default gateway, upon receiving this DRS packet appends its IP address to the DRS packet, forwards it to its gateway, and sets up a route to the downstream clients whose addresses were included in the DRS in its routing table. This process continues, until the packet reaches the server. This path is used by the server to set up downstream routes to reach the clients along the path. For another embodiment, instead of sending only IP addresses, the reverse beacon includes a list of links, i.e. the relationship between the various clients in the branch. This will be discussed in more detail below.

For another embodiment, each node periodically initiates a reverse beacon broadcast. This period is the KEEPALIVE period. For one embodiment, the timing of the start of the period is jittered, such that not all nodes initiate the reverse beacon at the same time. The reverse beacon includes a From address, the address of the initiating node, and a To address, which is the address of the node's default gateway. The node's default gateway, on receiving this reverse beacon adds the route to the initiating node to its routing table. It then passes on the reverse beacon after having added its address to it, as described above. Each client sends a single reverse beacon in each cycle, and aggregates other reverse beacons in the interim. Thus, if a client receives three reverse beacons, when it is time for the client to send its reverse beacon, it sends a single beacon to its default gateway, including all of the data from the three reverse beacons it received.

FIG. 3B illustrates an alternative method of initiating communication with the server. When a Client wishes to initiate communication with the Server, to establish an http connection or the like, it accesses its temporary memory for the current route to the Server. The current route might read, for instance, F->G->H->S, where F labels the Client seeking to initiate communication with the Server S.

Client F sends an Initiation Request (IR) to Client G. For one embodiment, the IR is a data packet that contains the path (F->G->H->S) in addition to a request addressed to the Server S to initiate a connection. Client G uses the path information contained in the IR to figure out whom to forward this packet to. In this example, Client G forwards the packet without change to Client H. Client H then forwards it to the Server S. On receipt of the IR, the Server knows how to get back to Client F, since it received the path F->G->H->S. The Server acknowledges receipt of the IR to Client F via the path (S->H->G>F). A two-way connection can be set up at this point.

It should be emphasized that, at the end of a routing cycle, each Client that is currently part of the network knows its default gateway, which leads to the server. The client further is aware, for one embodiment, of all clients downstream from it that use this client to reach the server.

For another embodiment, the client may know its entire route. For example, Client X's route might read (X->B->L->D->S). Furthermore, for one embodiment, Clients only know their own branch, i.e. its default gateway to the server, the path to the server, and the nodes downstream from it that use this client to access the server. This is to be viewed as a strength of the proposed routing protocol—in a network architecture wherein Clients seek to communicate with a server that controls access to a wired Internet, peer-to-peer connectivity is generally unnecessary. The larger the number of links or paths that need to be maintained by each Client, the more complex and harder to implement the protocol becomes, and the more wasteful it is of bandwidth. Thus, the advantage of reduced bandwidth and memory requirements outweighs the disadvantage of not having each client have a routing table that includes every other client. For one embodiment, as will be described in more detail below, the Server has a path to each of the Clients. Thus, client-to-client connectivity may be established through the Server.

Block Diagrams

Figure 4:
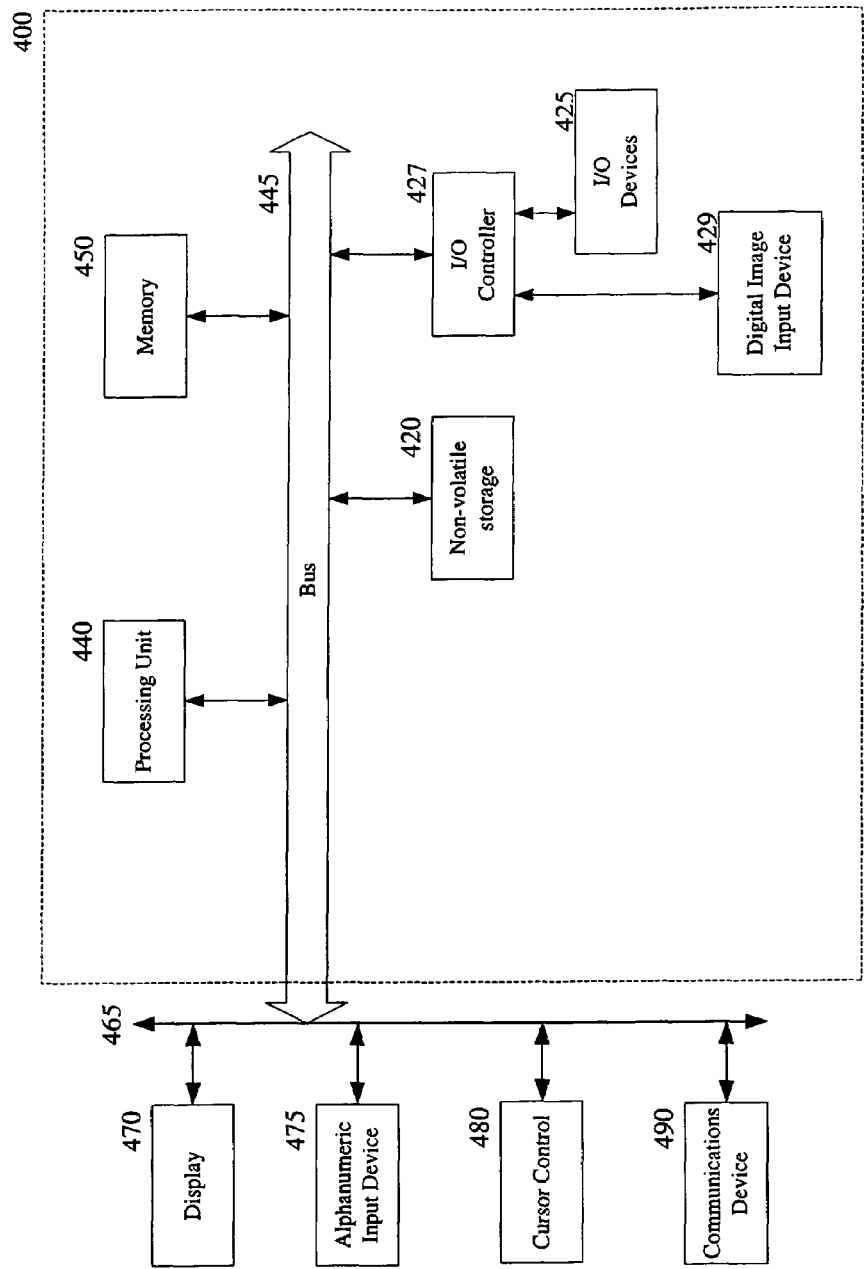
FIG. 4 is a block diagram of one embodiment of a computer system on which the present invention may be implemented.

FIG. 4 is one embodiment of a computer system that may be used with the present invention. It will be apparent to those of ordinary skill in the art, however that other alternative systems of various system architectures may also be used.

The data processing system illustrated in FIG. 4 includes a bus or other internal communication means 445 for communicating information, and a processor 440 coupled to the bus 445 for processing information. The system further comprises a random access memory (RAM) or other volatile storage device 450 (referred to as memory), coupled to bus 445 for storing information and instructions to be executed by processor 440. Main memory 450 also may be used for storing temporary variables or other intermediate information during execution of instructions by processor 440. The system also comprises a read only memory (ROM) and/or static storage device 420 coupled to bus 440 for storing static information and instructions for processor 440, and a data storage device 425 such as a magnetic disk or optical disk and its corresponding disk drive. Data storage device 425 is coupled to bus 445 for storing information and instructions.

The system may further be coupled to a display device 470, such as a cathode ray tube (CRT) or a liquid crystal display (LCD) coupled to bus 445 through bus 465 for displaying information to a computer user. An alphanumeric input device 475, including alphanumeric and other keys, may also be coupled to bus 445 through bus 465 for communicating information and command selections to processor 440. An additional user input device is cursor control device 480, such as a mouse, a trackball, stylus, or cursor direction keys coupled to bus 445 through bus 465 for communicating direction information and command selections to processor 440, and for controlling cursor movement on display device 470.

Another device, which may optionally be coupled to computer system 430, is a communication device 490 for accessing other nodes of a distributed system via a network. The communication device 490 may include any of a number of commercially available networking peripheral devices such as those used for coupling to an Ethernet, token ring, Internet, or wide area network. Note that any or all of the components of this system illustrated in FIG. 4 and associated hardware may be used in various embodiments of the present invention.

It will be appreciated by those of ordinary skill in the art that any configuration of the system may be used for various purposes according to the particular implementation. The control logic or software implementing the present invention can be stored in main memory 450, mass storage device 425, or other storage medium locally or remotely accessible to processor 440. Other storage media may include floppy disks, memory cards, flash memory, or CD-ROM drives.

It will be apparent to those of ordinary skill in the art that the methods and processes described herein can be implemented as software stored in main memory 450 or read only memory 420 and executed by processor 440. This control logic or software may also be resident on an article of manufacture comprising a computer readable medium having computer readable program code embodied therein and being readable by the mass storage device 425 and for causing the processor 440 to operate in accordance with the methods and teachings herein.

The software of the present invention may also be embodied in a handheld or portable device containing a subset of the computer hardware components described above. For example, the handheld device may be configured to contain only the bus 445, the processor 440, and memory 450 and/or 425. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

Figure 5:
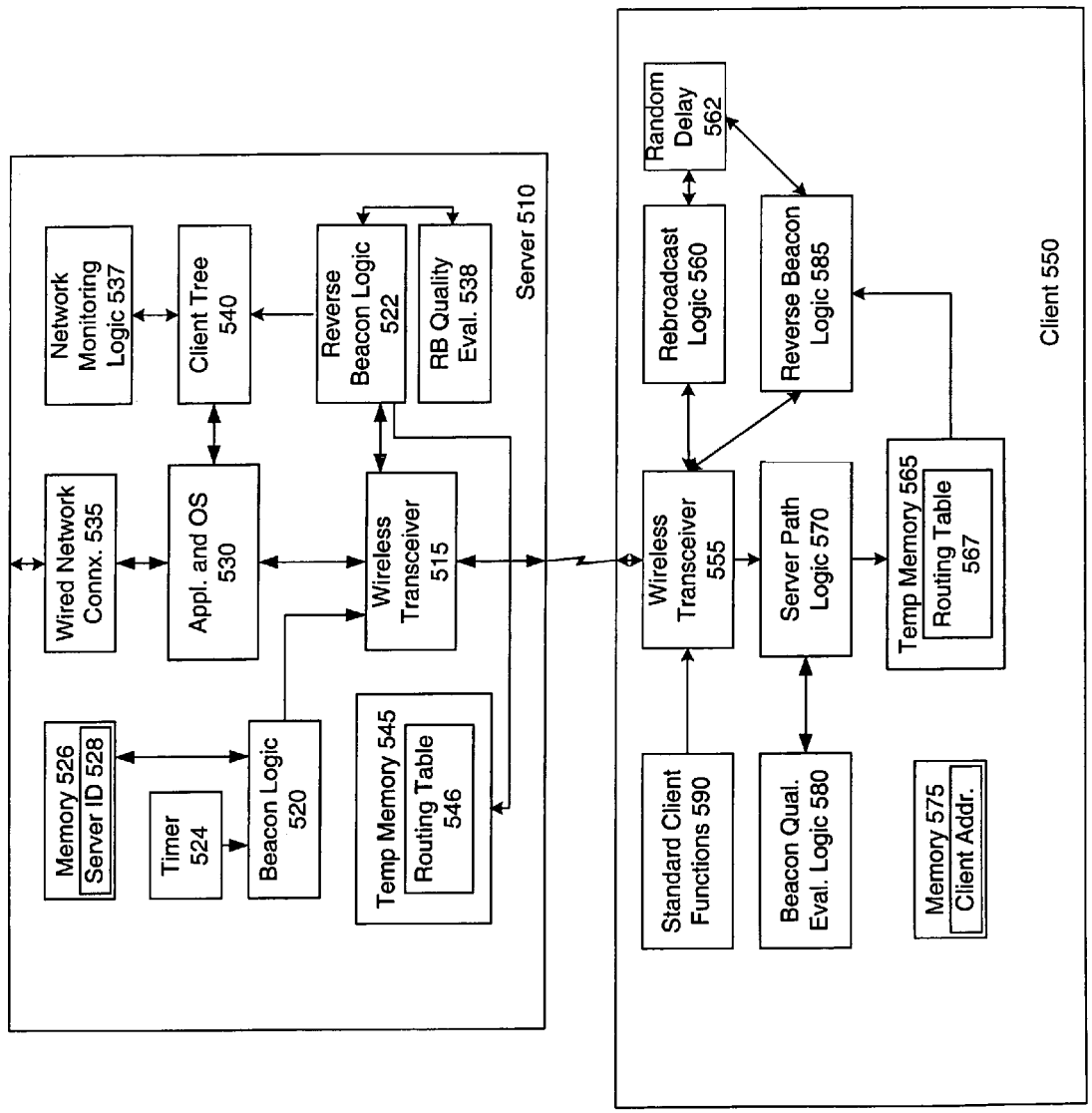
FIG. 5 is a block diagram of one embodiment of a client and a server that may be used in the present invention.

FIG. 5 is a block diagram of one embodiment of a client and a server that may be used in the present invention. The server 510 includes a wireless transceiver 515 to communicate with clients 550, as well as a wired network connection 535, to communicate with the wired network, such as the Internet.

The beacon logic 520 in server 510 periodically sends out a beacon, including the server's server ID 528. The server ID 528 is stored in memory 526. The beacons are timed by timer 524. For one embodiment, beacons are sent out periodically. In an alternate implementation, the periodicity of beacon broadcasts might be dynamically determined. For example, the periodicity may be determined based on network stability, or network age. For example, for a network in which the nodes are constantly moving, like a cellular telephone based network, the period may be shorter than the period for a network in which the nodes are generally stable, like generally stationary laptops. The period between beacons may be as little as a fraction of a second, or as long as many minutes. For one embodiment, the beacons are sent out every minute. The beacon is broadcast by wireless transceiver 515 to all clients within range of the broadcast.

For one embodiment, the server 510 also receives a reverse beacon from the clients, indicating a path to each of the clients. The reverse beacon is used to generate a routing table. The routing table provides the server 510 with a known path to all clients.

For one embodiment, the reverse beacon includes not only the addresses of each of the clients, but the links between the clients. Thus, instead of receiving merely addresses, the server 510 receives a path structure for each of the branches. The server 510 uses this to construct a client tree 540. The client tree 540 illustrates the entire network layout. Network monitoring logic 537 may use the client tree 540 construct a visual image of the cluster controlled by server 510, as well as of the relationship between nodes. This permits the network monitoring logic 537 to evaluate connectivity and quality as well.

For one embodiment, the reverse beacon is initiated by the server 510, using dummy reverse beacon logic 522. A dummy reverse beacon is an indicator to a Level One client that the client should, within a preset period, respond with an actual reverse beacon. In general, the reverse beacon for a client at any level is initiated upon receipt of the overheard reverse beacon from its default gateway (in the case of level one clients, the default gateway is the server). For one embodiment, the dummy reverse beacon is used to synchronize timing, such that reverse beacon signals are not sent out at the same time by all clients.

The server 510 is designed to receive requests from various clients. These requests, for one embodiment, include the path to the client. Thus, a temporary memory 543 stores the IP address of a client requesting something from the server.

The request is fulfilled by request fulfillment logic 530, by accessing the wired network through wired network connection 535, using data within the server 510, or by forwarding the request to the appropriate client. When the server 510 receives a response to the request, it uses the path 546 from memory 543 to forward the response to the client 550 that requested the data.

In this way, the server provides data to the clients 550, as well as a periodic beacon to permit a client 550 to determine its path to the server 510.

Client 550 is coupled to the server 510 through network, either directly or through other clients. The network may be a wireless network, a switch-to-wired network, or another type of network. Client 550 includes a transceiver 555 for transmitting and receiving data over the network. For one embodiment, in a wireless network, transceiver 555 is a wireless transceiver. For another embodiment, client 550 may be coupled to server through a wired connection, in which case the logic illustrated as a wireless transceiver 550 may be a wired connection, such as a modem, Ethernet card, DSL connection, etc.

Client 550 receives the beacon from the server 510, either directly or through other clients, and passes this data to server path logic 570. Server path logic 570 determines whether the path should be stored and rebroadcast. The client 550 may receive multiple beacons, but only rebroadcasts one beacon, in general. The matter of multiple servers and multiple beacons will be discussed in more detail below. Server path logic 570 determines which beacon to select as the path to the server. For one embodiment, this determination is made based on the link quality. Beacon quality evaluation logic 580 evaluates the link quality of each beacon received. For one embodiment, beacon quality evaluation 580 tracks all beacons received by the client 550, and determines reliability (number of times the beacon is heard within a period), link quality (signal-to-noise ratio), the level of congestion on the path, and possibly other features of the link. Each of these features is taken into consideration by server path logic 570 to determine which route 567 to store.

For one embodiment, server path logic 570 evaluates data from previous routing cycles. The reliability of the beacon, i.e. how many times out of the last X times a beacon was sent was this beacon received, is used to determine whether this is the beacon that should be stored for this routing cycle. For another embodiment, an alternative criterion may be used by the server path logic 570 to determine whether to select this particular path.

When the server path logic 570 identifies the beacon, the routing data associated with that beacon is stored in memory 565, in routing table 567. For one embodiment, within a preset period of time, only a single path to server is stored and rebroadcast. For another embodiment, each beacon is stored, and information is added to the routing table 567, but only a single beacon is rebroadcast. For yet another embodiment, for each server from whom a beacon is received, a path is stored, and the beacon is rebroadcast. This permits the client to have paths to multiple servers, which may be advantageous if a server becomes unavailable.

Memory logic 575 then adds the client's own address and TMC to the beacon, and passes this data back to rebroadcast logic 560. The rebroadcast logic 560 passes the modified beacon to the wireless transceiver 555 after a delay. For one embodiment, delay is generated by random delay logic 562. For one embodiment, the delay is preset to a certain value, for each client 550. For another embodiment, the delay is randomly generated by random delay logic 562, for each rebroadcast. For another embodiment, random delay logic 562 may not be present.

For one embodiment, client 550 further includes reverse beacon logic 585. Reverse beacon logic 585 broadcasts the path upwards to the client. For one embodiment, reverse beacon logic 585 is triggered when the reverse beacon is received from the default gateway of the client. The reverse beacon provides a list of all clients whose routes to the server pass through the client that broadcasts the reverse beacon to the server. Thus, the server receives a reverse beacon that contains routes to all of the clients, transmitted to the server only through the Level One clients. This provides a full path to all of the clients to the server, and permits the server to have a complete routing table, including all clients that are in its partition. For one embodiment, the clients only include in their routing table the default gateway toward the server, and the downstream clients on the same branch. Therefore, the memory and routing overhead requirements are limited, compared to a non-partitioned network.

For another embodiment, the reverse beacon may be replaced by a downstream route setup (DRS) or an initiation request. Both of these processes are described in more detail below.

The client 550 further includes logic to perform the standard client functions 590. These client functions depend on the individual client. For example, for a telephone, the standard client functions 590 may include dialing functions, address book functions, etc.

Beacon Selection

Figure 6A:
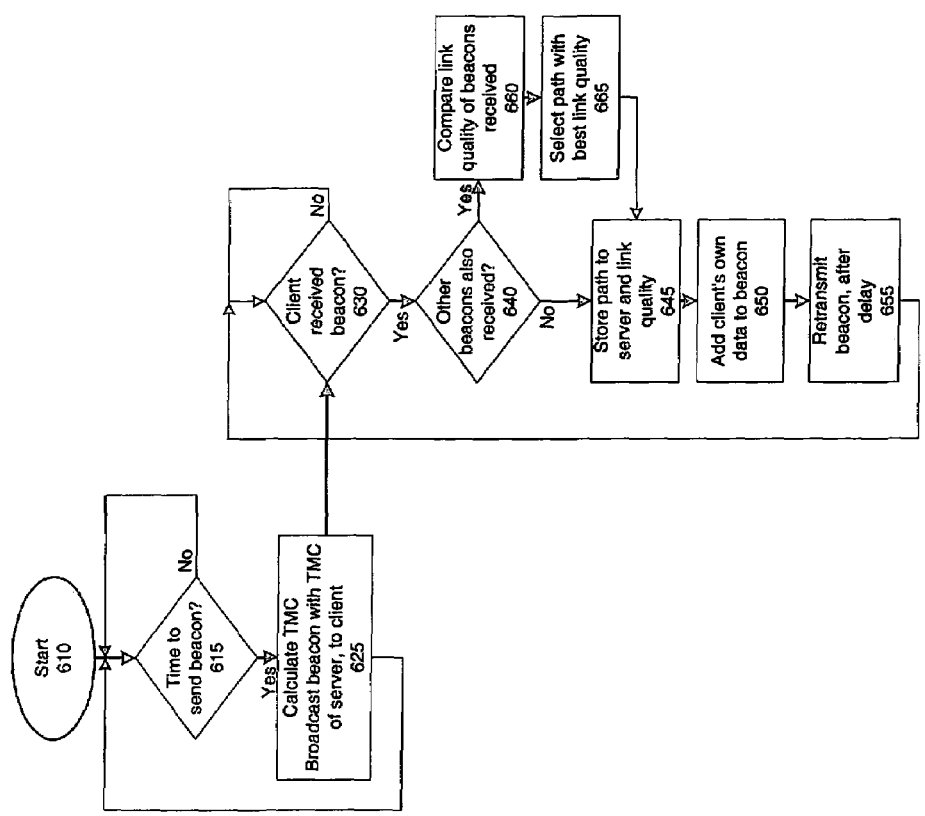
FIG. 6A is an overview flowchart of one embodiment of registering a beacon.

FIG. 6A is a flowchart of one embodiment of registering a beacon. The process starts at block 610. At block 615, the server determines whether it is time to send out the beacon again. The beacon is sent out periodically. If the timer has expired, the process continues to block 620. Otherwise, the process returns to block 615, to wait for the timer to expire.

At block 620, the traffic monitoring code (TMC) of the server is calculated. The TMC indicates how timely requests were served from that server. For one embodiment, the TMC is simply an indication of the time between the receipt of a request and the response being sent, e.g. the delay of the server. For another embodiment, the TMC may indicate traffic load, e.g. how many requests were received over a period of time. For one embodiment, the TMC is a single number, which indicates a relative load and delay. For another embodiment, the TMC may not be calculated.

At block 625, the server broadcasts the beacon to all the clients. The beacon includes the server's own address and the server's TMC, if appropriate.

At block 630, a client determines whether it has received a beacon. For one embodiment, the client generally watches for all broadcasts, either directed to it, or directed to all clients. In this case, if the client detects the beacon, it continues to block 640. Otherwise, it continues waiting for a broadcast.

At block 640, the client determines whether other beacon(s) have been received in this cycle. For one embodiment, the cycle is indicated by a sequence number. For one embodiment, each server has a sequence that it runs through. For one embodiment, if a client receives beacons from multiple servers, it stores both beacons, and selects the server to use for its requests based on the number of hops to the server and the TMC of the path.

For another embodiment, the cycle is identified by time, and if multiple beacons from multiple servers are received, they are all compared, and only a single path is stored. In either case, only a single beacon is rebroadcast. This automatically partitions the network into distinct clusters administered by distinct servers.

If there have been no other beacons in this cycle, the process continues to block 645. For one embodiment, this determination is only made after a sufficient amount of time has elapsed to collect all available beacons. At block 645, the client stores the path to the server, along with the TMC. For one embodiment, the client identifies as its default gateway the next upstream node, which leads to the server.

At block 650, the client's own data is appended to the beacon. For one embodiment, the data includes the client's address and the client's own TMC. For another embodiment, only the client's address is included.

At block 655, after a delay, the modified beacon is rebroadcast by the client. The client now has a valid path to the server, and also has passed on its data to all other clients within its broadcast range. At this point, the client can await the next beacon. If the client has requests for the server, the stored path may be used to send this request. This process is discussed in more detail below.

If, at block 640, it was found that more than one beacon was received for a cycle, the process continued to block 660.

At block 660, the paths are compared. For one embodiment, the first level of comparison is the number of hops between the client and the server. Thus, preference is given to Level One beacons, compared to Level Two, etc. For one embodiment, the TMC of the path is further compared. Thus, for example, having a Level Two beacon through an extremely busy client is not more useful than having a Level Three beacon through two underutilized clients. Therefore, for one embodiment, the TMC is considered, in addition to the level of the beacon. For one embodiment, the beacon reliability is further considered. Reliability indicates how often the beacon is heard. If a beacon is not heard regularly, e.g. fades out, it may not be reliable. Such a reliability rating may also be used in evaluating which beacon to select. For one embodiment, the link quality may further be used to evaluate the beacon. The link quality for one embodiment is the signal-to-noise ratio of the link. All of these factors, and additional factors that may be useful, may be taken into consideration when choosing a path.

At block 665, the "optimal path" is chosen, based on preset criteria. There are several possible criteria for the selection of a beacon. For one embodiment, the criterion might be the reliability of the beacon (i.e., how many times a beacon was received on this path in the last N periods). For another embodiment, the criterion might be the strength of the link (which could be characterized, for instance, by the sum of the signal-to-noise ratios on each link in the path). For another embodiment, the criterion for the selection of a beacon might be the congestion experienced in the recent past along the path indicated by the beacon (for instance, this could be measured by the sum of the TMC bits for each node along the path from the Server). For another embodiment, this criterion might be the number of hops on the path to the Server. For one embodiment, this criterion might include a consideration of the amount of backhaul present at the Server originating the beacon, so that a Client might elect to belong to a Cluster wherein the Server has a larger back-end capacity. For one embodiment, this criterion might be the number of Clients in the Cluster, so that a Client may elect to join a Cluster that has the fewest member Clients. It will be apparent to one skilled in the art that any or all or a combination of the above proposed criteria could be used in a system. It will also be apparent that the above-mentioned criteria would apply to the selection by a Client of a beacon either in the context of a network with a single Server or one with multiple Servers.

The process then continues to block 645.

Figure 6B:
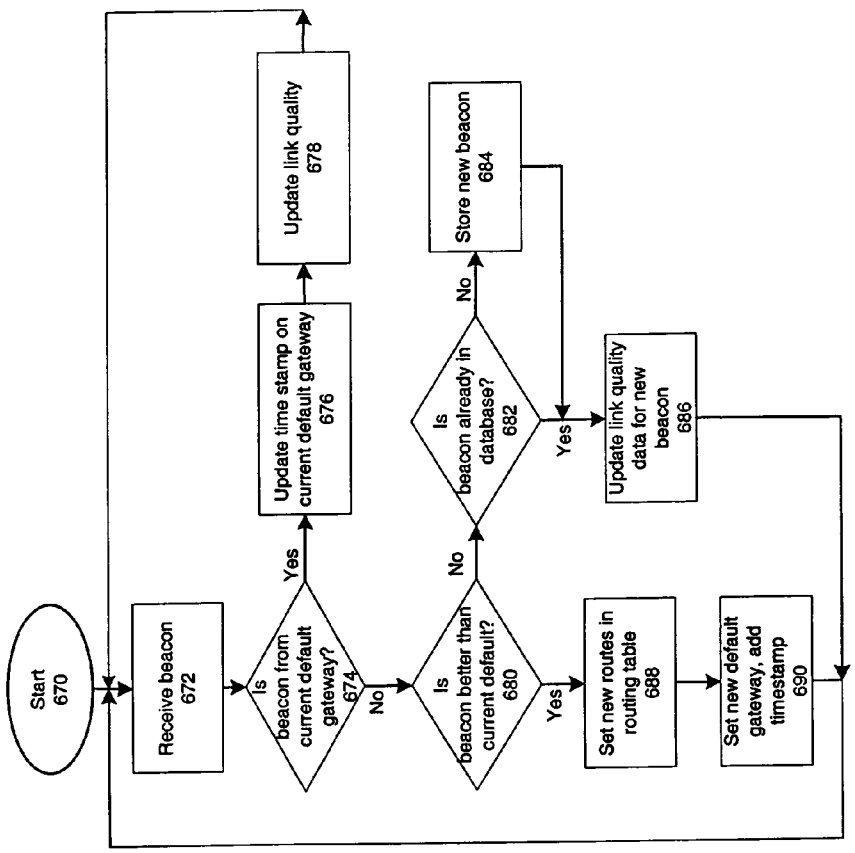
FIG. 6B is a flowchart of one embodiment of selecting a beacon for rebroadcast.

FIG. 6B illustrates an alternative embodiment of evaluating the beacons, in a situation where there may be more than one server. For one embodiment, a single node may receive beacons from multiple servers. In that instance, for one embodiment, only a single path and a connection to a single server are stored. For another embodiment, however, paths to multiple servers are stored. For one embodiment, for example, a single client may receive multiple flavors of beacons, from multiple servers. The client may then establish paths to each of the multiple servers. However, the client only sets one path as the default gateway, and only retransmits a single beacon, for one embodiment. When the client then receives a request from a downstream client, it determines the destination server for the request, and further transmits the request in the appropriate direction.

The process starts at block 670. This is a monitoring state. At block 672, a beacon is received. The routing number of this beacon is stored, along with the identity of the originating server.

At block 674, the process determines whether the beacon is from the current default gateway. If the beacon is from the current default gateway, the process continues to block 676. At block 676, the time stamp on the current default gateway is updated. At block 678, the link quality data of the current default gateway is updated as well. Note that this is the beacon that will be rebroadcast, unless before it is time to rebroadcast, a new default gateway is set up. In that case, the new default gateway is the beacon that is rebroadcast. The process then returns to block 672, to await the receipt of another beacon.

If, at block 674, it was found that the beacon was not from the default gateway, the process continued to block 680.

At block 680, the process determines whether the link quality of the new beacon is better than link quality of the current default gateway. If it is not, the process continues to block 682.

At block 682, the process determines whether the path indicated by the beacon is already in the database of paths. For one embodiment, all paths received via a beacon are stored. For one embodiment, periodically, the database is purged of beacons that have not been received in a preset period of time.

If, the path has not yet been received, the process continues to block 684. At block 684, the new path is stored in the database. For one embodiment, the new path is stored including the number of hops to the server, as well as other parameters associated with the beacon. At block 686, the link quality of the beacon is stored with a time stamp. If the path is already in the database, at block 684, the process continues directly to block 686, where the link quality for the path is updated. For one embodiment, at block 686, if the beacon was from another server, the path identified by the beacon is set as an alternative default gateway. This permits the node to switch to the alternative server, if the server to whom the default gateway is connected becomes unavailable. The process then returns to block 672, to await the receipt of a new beacon.

If, at block 680 the link quality is found to be better than that of the currently stored default gateway, the process continues to block 688.

At block 688, the new route, as indicated by the beacon, is set in the route table. At block 690, the new default gateway is set up. The process then returns to block 672. Note that this new default gateway is rebroadcast by the client, the next time the client does a beacon rebroadcast. If the same default gateway's beacon was received, that default beacon is rebroadcast, the next time the client does the beacon rebroadcast.

Figure 7A:
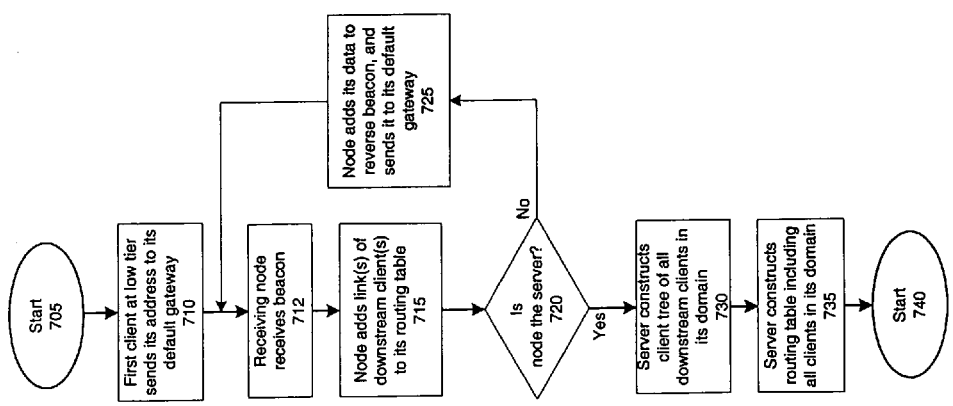
FIG. 7A is a flowchart of one embodiment of a reverse beacon.

FIG. 7A is a flowchart of one embodiment of a reverse beacon. The process starts at block 705. For one embodiment, the process is started by a dummy reverse beacon, originated by the server. For one embodiment, clients at a certain level do not rebroadcast their beacons. This would be at levels when the latency is unacceptably long, e.g. forty clients from the server, where the latency reaches more than one minute. Alternatively, this may occur after a preset period of time has elapsed, which is calculated to permit the beacon to reach all clients.

At block 710, a first client at the lowest tier sends a reverse beacon to its default gateway, including its address. The reverse beacon is directed to the server. For one embodiment, the client broadcasts this data, addressed to its default gateway. Thus, all other nodes receiving the message would discard it, while the default gateway would actually evaluate the message. For one embodiment, reverse beacons are special messages, and are sent addressed to a special port. This is what identifies a message as a reverse beacon. For one embodiment, the message is acknowledged by upstream client, the default gateway.

At block 712, the default gateway, or current node, receives the reverse beacon.

At block 715, the node that received the reverse beacon adds the links to the downstream client(s) to its routing table. For one embodiment, the links are first verified. This may be done by sending a message, and receiving acknowledgement, for each of the downstream clients. Thus, the downward branches of the tree on which the client resides are accessible from the client.

At block 720, the process determines whether the current node is the target server. If the current node is not the server, the process returns to block 725.

At block 725, the node sends the reverse beacon to its default gateway. The reverse beacon includes the client's own address, and the links to the downstream clients that are accessible through it, again addressed to the server. This constitutes, in effect, a full network diagram of the portion of the network below the current client. The process then returns to block 712, and the next node receives the reverse beacon, and the process continues. For one embodiment, each client collects the reverse beacons received from its downstream clients in one cycle, and sends up the combined list. In this way, clients successively higher up the chain send larger and larger messages, but each client still only sends one reverse beacon during each Reverse Beacon Period. For another embodiment, the client waits for a preset period of time before sending the messages. Not all downstream clients may have sent their reverse beacons. However, the additional data is included in the subsequent reverse beacon.

If the node was the server at block 720, the process continues to block 730. At block 730, the server adds the data from the reverse beacon to its routing table. The server receives reverse beacons from all Level One clients. For one embodiment, the server constructs a client tree of all downstream clients. The client tree is a structure that shows the connections between the nodes in the entire cluster served by the particular client. The client tree uses the link data from the reverse beacon to construct this tree. Note that each branch is only aware of itself, however, the server receives reverse beacons from all branches. In other words, clients are aware of the full tree downstream, and only one client upstream. The server is also aware of the full client tree downstream.

At block 735, the server stores the client tree. At this point, the server knows the path to all of the clients that have received its beacon. This permits client-to-client communications through the server. It also permits the server to address any client in its cluster, without having to wait for a request from the client. The process then ends at block 740.

Figure 7B:
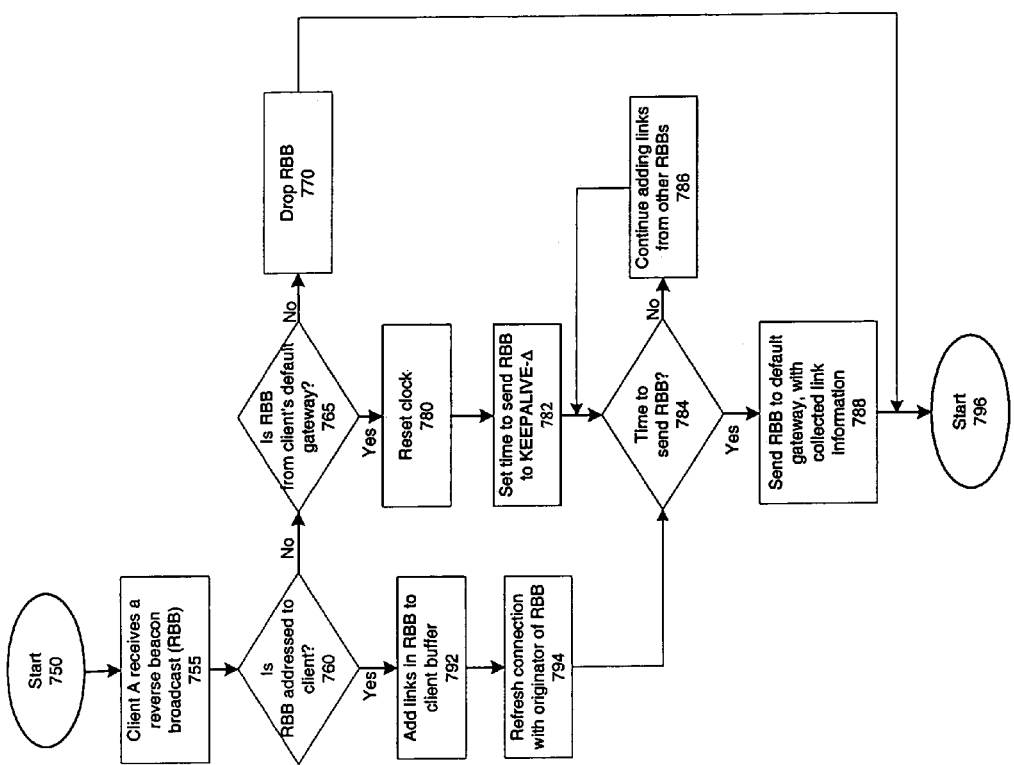
FIG. 7B is a flowchart of one embodiment of timing the reverse beacon broadcast.

FIG. 7B is a flowchart of one embodiment of timing the reverse beacons. The process starts at block 750. At block 755, client A receives a reverse beacon broadcast (RBB).

At block 760, the process determines whether the RBB is addressed to client A. If it is, then the process continues to block 792. At block 792, the links in the RBB—which were collected by the downstream client as explained above—are added to client A's buffer. This buffer will be used to construct the RBB sent upstream.

At block 794, the connection to the downstream client that originated the RBB is refreshed. For one embodiment, the address of the client is added to the routing table of client A. The process then continues to block 784, where the system waits to send its reverse beacon broadcast, now including this link. Note that the process shown in blocks 755, 760, 792, and 794 occurs every time a new RBB is received by client A.

If, at block 760, it was found that the RBB was not addressed to client A, the process continues to block 765.

At block 765, the process determines whether the RBB was sent by the default gateway of client A. If not, the process continues to block 770, and the RBB is dropped without any further action. The process then ends at block 796.

If, at block 765, it was found that the RBB was originated by A's default gateway, the process continues to block 780.

At block 780, the dock is reset. This type of overheard RBB is used to synchronize the clock of client A. The benefit of performing clock synchronization is that information about changes to the network propagates up to the server much faster than otherwise. This reduces the convergence time of the protocol, which is advantageous.

At block 782, client A sets the time for sending the reverse beacon broadcast to KEEPALIVE-•. The value of • indicates the changing time until the reverse beacon is sent. Client A will not originate a reverse beacon broadcast until the timer is started by the overheard RBB from client A's default gateway.

At block 784, the process determines whether it is time for the client to send the RBB. If not, the process continues to block 786. At block 786, downstream RBB's are collected. This process is described with respect to blocks 792 and 794. Client A continues receiving RBB's and establishing connections, and adding links to its buffer.

If, at block 784, the timer has expired, and its time to send the RBB, the process continues to block 788. At bock 788, client A sends the RBB addressed to its default gateway, with a request to pass the RBB to the server. The process then ends, at block 796.

For one embodiment, the Level One client receives a dummy reverse beacon broadcast from the server, to initialize its dock. For one embodiment, the KEEPALIVE period for each client is varied by a small jitter factor, to prevent all clients at the same level from broadcasting at the same time. In this way, the reverse beacon is propagated up through the clients, and each client only sends a single reverse beacon broadcast in a single cycle. The length of the cycle may be set arbitrarily. For one embodiment, the reverse beacon cycle corresponds to the length of the beacon cycle. For another embodiment, the reverse beacon cycle may be set to another value. For example, in a largely stable system, the reverse beacon cycle may be one hour, while in an unstable system, the reverse beacon cycle may be considerably less than a minute.

Using Alternative Methods to Set Up Path from Server to Client

Figure 8A:
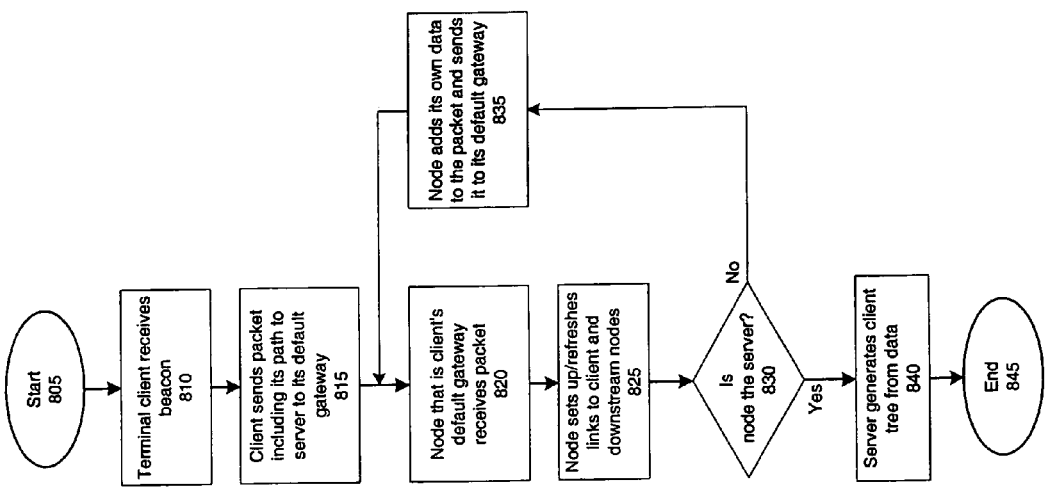
FIG. 8A is a flowchart of one embodiment of using DRS to send client connectivity data to the server.

FIG. 8A is a flowchart of one embodiment of using downstream route setup procedure (DRS) or an initiation request (IR) to send client connectivity data to the server. The process starts at block 805. At block 810, the client receives a beacon. The beacon selection process is described above with respect to FIGS. 6 and 7. The client has a selected default gateway, and has a path to the server of its choice.

At block 815, the client sends a packet to its default gateway, addressed to the server, including its full path. If this is a DRS method, this occurs in response to receiving a beacon. For one embodiment, if the client is set up to communicate its data using a DRS, a preset period of time after it receives the beacon, it sends this DRS packet addressed to the server. If this is an IR method, this occurs in response to a client having a request for the server. This request includes the full path to the client, as well as any request, if appropriate.

At block 820, the upstream node receives the packet.

At block 825, this node refreshes its route to the client from whom it received the packet, or sets up a new link, if the client was not in its routing table yet. The client also adds any intermediate clients that were included in the full path from the client.

At block 830, the process determines whether the current node is the server. If not, the process continues to block 835.

At block 835, the node sends on the packet to its default gateway, including its own information. This process is repeated, until the server receives the packet. If the node is the server, the process continues to block 840.

At block 840, the server creates a client tree, indicating the structure of its cluster. The server further performs any appropriate actions, if the packet was an IR packet, and there is a client request in this packet. At this point, the server has a full path to the client that originated the packet. As such packets are received, more and more of the routing table can be filled in. The process ends at block 845.

Figure 8B:
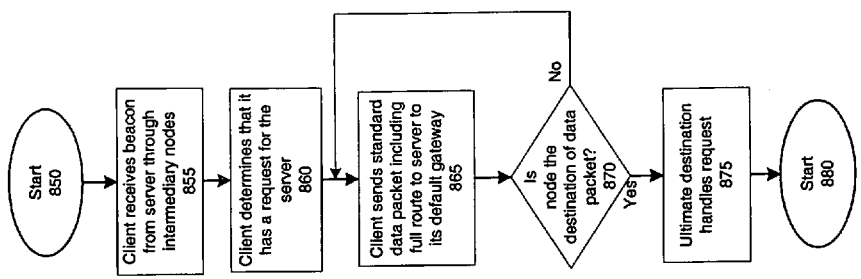
FIG. 8B is a flowchart of one embodiment of using source routing to send client connectivity data to the server.

FIG. 8B is a flowchart of one embodiment of using source routing to send client connectivity data to the server.

The process starts at block 850. At block 855, the client receives its beacon. The beacon includes the full path from the server to the client, including all intermediate nodes.

At block 860, the client determines that it has a request for the server. For one embodiment, this is a standard request.

At block 865, the client sends a standard data packet to its default gateway. This data packet includes the full route from the client to the server.

At block 870, the default gateway of the client receives the data packet, and examines it to determine whether it is the destination.

If the current node is the ultimate destination of the data packet, the process continues to block 875. Otherwise, the current node examines the data packet, and sends it to the next indicated node in the route, which is its default gateway. The process then returns to block 870.

At block 875, the ultimate destination, which in general is the server, receives the data packet, and processes it, as appropriate. The processing of data packets is known in the art. For one embodiment, the destination node returns data requested by the client. Other processes requested by the client may be performed, as appropriate. The process then ends, at block 880.

Note that in this system, the intermediate clients do not set up routing tables, adding the links indicated by the data packet. Thus, each individual data packet must include the full route to the server. For one embodiment, the server does set up a client tree and routing table. For another embodiment, the server need not set this up, since the reply path is specified in each data packet.

Figure 9:
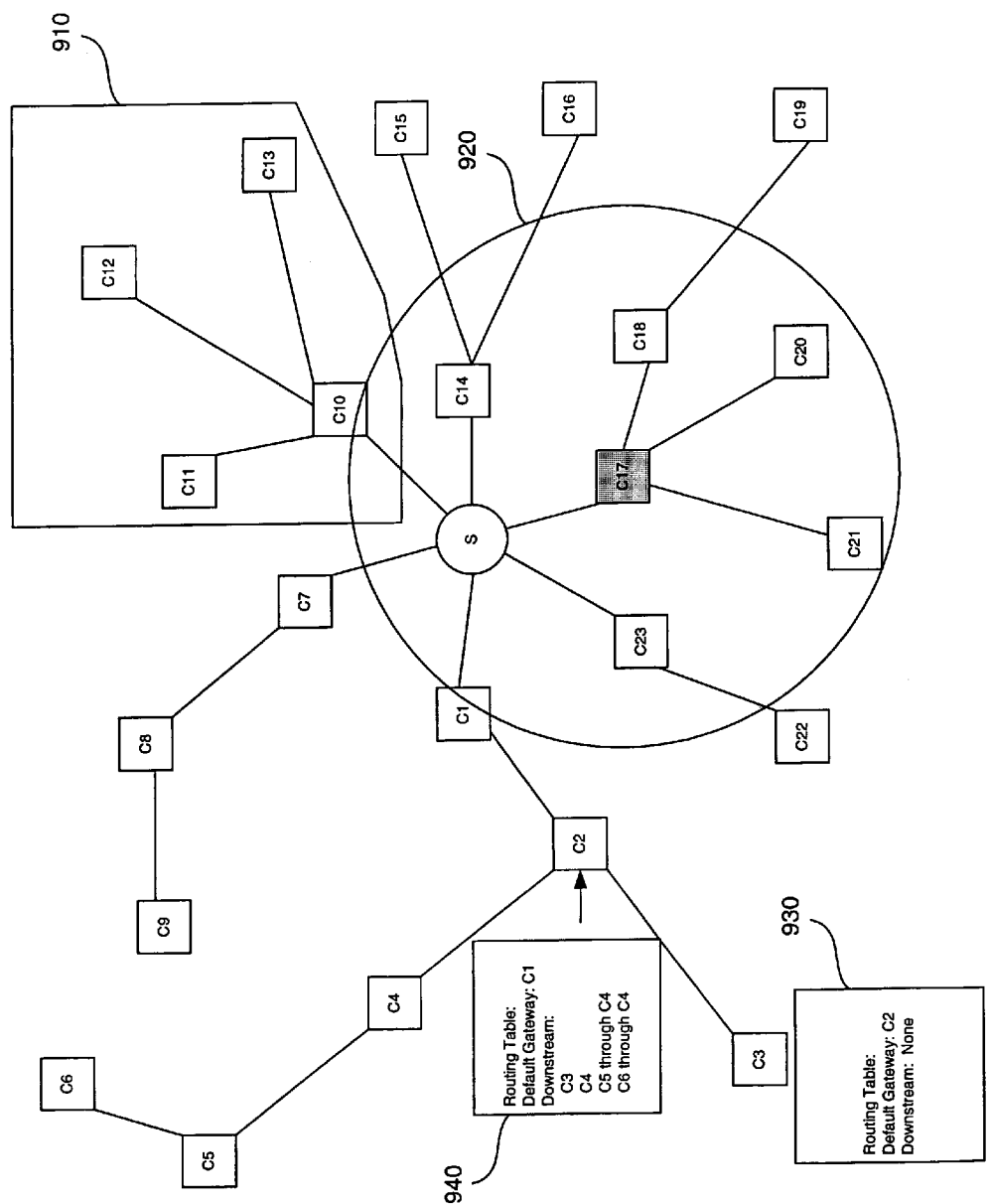
FIG. 9 is a network diagram of one embodiment of a server system, including a plurality of branches.

FIG. 9 is a block diagram illustrating the partitioning into branches of a system including a single server S. As can be seen, 23 clients are coupled to the server, directly or indirectly. A branch 910 is only aware of the other members downstream from it, on the same branch, and its upstream gateway. Thus, for example, client C10 would have a path to clients C11-C13, but not to any other clients. This significantly reduces overhead when the beacon is being retransmitted, since the Level One client C10 only receives three reverse beacon messages, rather than 23. This applies similarly to other branches. Only the server is aware that there are other branches, and only the server has a path to all of the branches.

Broadcast range 920 is illustrated for client C17. As can be seen, the broadcasts of client C17 are received by many clients, including some clients that are on other branches. However, the clients who are on other branches, i.e. C23 and C14, ignore the broadcast from C17, since they already have a shorter path to the server. The three clients that have C17 as their default gateway are all reached by the broadcast.

Routing tables 930, 940 further illustrate the reduction in communication resulting from dividing the system into independent branches. As can be seen, terminating client C3 (a client with no downstream clients coupled to it), has only a single entry in its routing table 930, it's default gateway.

Upstream client C2 has all of its downstream clients, i.e. C3-C6 in its routing table 940, in addition to its default gateway, C1. For each downstream client, C2 has in its routing table 940 a first hop address.

Accordingly, the largest routing table at a client in the example shown is the table of C1. C1 has as its default gateway the server S. C1, however, also has downstream routes to clients C2-C6. Therefore, the largest routing table, including default gateway, is six addresses. Compare this to a standard system in which each client has an entry for each other client, i.e. each routing table for each client includes 23 entries in this example. By significantly reducing the routing table size at the clients, considerable bandwidth is saved in this system.

Figure 10:
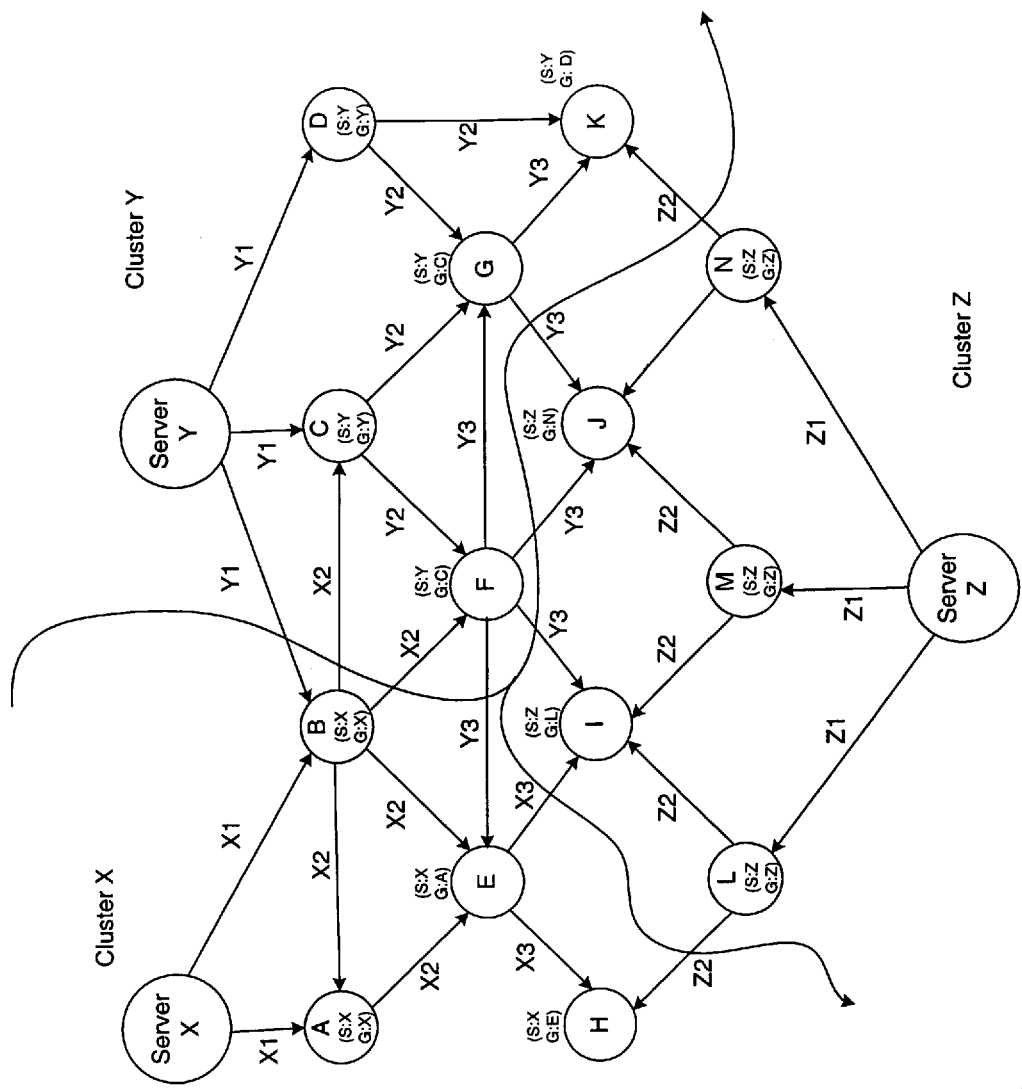
FIG. 10 is a network diagram of one embodiment of a system including multiple servers.

FIG. 10 is a diagram of one embodiment of a multi-server system. There are multiple servers X, Y, and Z. Each of the servers X, Y, and Z sends out a beacon, labeled X1 for X, Y1 for Y, and Z1 for Z. Each of the clients that receive one or more beacons rebroadcast one modified beacon, with the data of the client attached. Although the broadcasts are shown as individual arrows to the clients, the broadcasts are general, to all clients within reach.

Note that certain clients, for example, client I, receive beacons from multiple servers. For one embodiment, each client determines which single beacon to rebroadcast. However, for one embodiment, the clients store the beacons from each of the servers. For one embodiment, this permits a client that has an alternative path available to use that alternative path, if the first chosen path does not work. FIG. 10 further illustrates, for each client, a primary server shown as S, and a default gateway shown as G. This illustrates how all of the nodes are divided into separate Clusters, each Cluster associated with a server. By doing this, the number of clients sending data to any one server is significantly reduced. This reduces routing overhead, permits the system to self-optimize, and increases usability.

This property of the network of auto-partitioning itself into Clusters to optimally use the available backhaul at the Servers also has the added benefit of making the network more scalable and easier to manage. The network is more scalable because each Cluster is effectively a separate routing domain. The clients of a single Cluster do not need to exchange routing packets with those of other Clusters. This means that the routing overhead in terms of bandwidth is capped, leading to a more efficient utilization of the capacity of the network. Simultaneously, the creation of Clusters means that each Server is only responsible for the small number of Clients within its Cluster, so that the network management problem associated with administering and coordinating the Clients is broken up into bite-sized chunks that each Server can handle. This is especially advantageous if the Servers have limited processing capabilities.

For one embodiment, each server in this architecture performs one or more of the following functions: client authentication, billing, network monitoring, bandwidth provisioning, and guaranteeing a certain level of Quality of Service (QoS) for the Clients in its Cluster.

Client Authentication is the process whereby a Server verifies the identity and access privileges of a new Client that joins its Cluster. Billing includes the tracking of network usage by each Client. For example, for billing the server may maintain a table of its Clients and the amount of the data they have uploaded/downloaded in the last billing period. Network monitoring includes maintaining, in real-time, a map of the network that displays the Clients currently in the Cluster and their mutual connectivity. The Client Tree/Client Database maintained by the Server may be used to generate a map that shows the state of the network in real-time. This would be useful for monitoring the status and activity of the network and the traffic flows within it and would be valuable to a service-provider managing a network of customers. It would also serve a role in fault-isolation—if a node were to crash or a link were to fail, thereby resulting in loss of service to one or more customers, the service-provider may consult the map to locate the source of the outage.

It is readily seen that each of these functions performed by the Server increases in complexity as the size of the network administered by the Server grows. An advantage of the network architecture and routing protocol presented herein lies in the observation that the creation of Clusters leads to a reduction in the workload of each Server. For instance, in a situation with one Server and 100 Clients, if an additional Server is introduced into the network, the workload of each Server is halved, since each is now only managing 50 Clients. This, of course, assumes that the servers have the same capacity. Since each individual client evaluates which server to select, if one server has a higher capacity than the others, then one cluster would be larger than the other.

A further advantage of this network architecture is the support it provides for roaming of users within the coverage area. If a Client system that is mobile wanders around within the area of a single Cluster, its path to the Server (hence its route table) undergoes changes on the time scale set by the routing period. If the routing period is sufficiently small, say 1 second, the change of route will not lead to a noticeable drop in performance as measured by speed of downloads or latency of transfers, etc.

Figure 11:
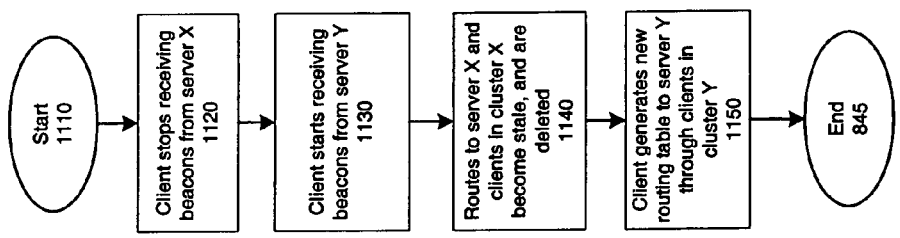
FIG. 11 is a flowchart of one embodiment of roaming between clusters.

FIG. 11 is a flowchart of one embodiment of a client roaming between clusters. The process starts at block 1110, when a mobile Client moves from one Cluster to another, say from Cluster X administered by Server X to Cluster Y administered by server Y.

At block 1120, the client stops receiving beacons from server X. This occurs when the client is out of the reach of the beacons of Server X. For one embodiment, the client need not actually stop receiving beacons. Rather, the beacons from server X may be of inadequate quality for use.

At block 1130, the client starts receiving beacons from server Y, either directly or relayed through clients in cluster Y. The client may have received beacons from cluster Y previously, but has selected server X as its primary route to the network. Therefore, since at this point the client is no longer receiving beacons from server X, server Y is selected as the primary server.

At block 1140, the route to Server X and to all Clients in Cluster X expires or becomes stale. For one embodiment, this occurs after a preset period of time. For example, this may occur after three beacon cycles, in which no beacon is received from server X. For one embodiment, the client may delete these routes from its routing table, when they expire. For another embodiment, the client may store these routes for a period of time beyond their expiration date, for link quality evaluation purposes.

At block 1150, the client generates a new route table based on the routing packets received while in Cluster Y. This route table comprises direct and indirect routes to Server Y and to certain Clients in Cluster Y as determined by the routing protocol. This process of acquiring data to fill in the routing table was discussed in more detail above. At this point, the client again has connectivity to the server. The process then ends at block 1160. The process described above need not occur in this order. Rather, each of the steps may occur in any order, after the client moves from an area where server X is the primary selected server, to an area where that is not the case.

In this way the routing protocol results in the generation of a new routing table in the Client as it moves from one Cluster to another. Since the sequence of steps outlined can be made to happen arbitrarily fast, there may be no consequent disruption in the user experience. The routing protocol therefore supports roaming, in much the same fashion as is common in cellular telephone networks, the key difference being that this is achieved here in the context of a multi-hop data network.

Roaming of a Client from one Cluster to another is one situation in which the membership of a Cluster may change. Another situation in which this might happen occurs when a new Server is added to the network. In this case the added Server starts its own Cluster and some of the Client members of the old Cluster now form associations with the new Server, thereby resulting in two Clusters where only one existed previously. The way in which the network reconfigures itself through the creation of new Clusters and fragmentation of old ones in response to the addition of new Server or backhaul points is a feature of this routing protocol. This feature has the advantage that it enables the network to quickly adjust itself to optimally make use of the available backhaul. Backhaul is the bandwidth and data processing capability of the server, with which the client communicates. This is of obvious benefit to a service-provider seeking to increase the capacity of the network.

Another situation in which the membership of Clusters might change is one where a Client radio is connected to a wired connection so that it now has both a wired and a wireless connection. This means that the Client in question becomes a Server and can start advertising its service through beacons. This will lead to a Cluster forming around this new Server in a way analogous to that outlined in the previous paragraph. The utility of this is that a service-provider in a dense urban area with a large number of customers can, for instance, choose to upgrade one or more of the customers to Servers by giving them, in addition, a wired connection such as a DSL line or a T1 line. The network then readjusts itself to take advantage of the newly introduced wired backhaul. This is a convenient way for a service-provider to increase network capacity.

The ability to seamlessly add additional capacity—either through the introduction of new Servers/Access Points, or through upgrading a Client to a Server by provisioning a wired connection at their home—is of obvious benefit to a service-provider providing wireless internet access to a population of customers. It gives the service-provider a way to easily increase the capacity of the network in proportion to the demand by adding new backhaul points wherever desired in the network.

In the foregoing specification, the invention has been described with reference to specific exemplary embodiments thereof. It will, however, be evident that various modifications and changes may be made thereto without departing from broader spirit and scope of the invention as set forth in the appended claims. The specification and drawings are, accordingly, to be regarded in an illustrative rather a restrictive sense.

We claim:

1. A routed wireless network comprising:
   a plurality of wired access points;
   a plurality of clients, each client belonging to a cluster of clients administered by a single server and such that membership in a cluster is elected by the client through a selection of a beacon to rebroadcast; and
   one path identified by the beacon designated as the optimal path, setting a default gateway as identified in the optimal path, and rebroadcasting only the beacon representing the optimal path by a client selecting the beacon, wherein the optimal path provides a complete path to the single server, and the beacon includes addresses of all clients included within the complete path to the single server.

2. The network of claim 1, wherein the membership in the cluster may change as a result of a client roaming from one region to another within the network.

3. The network of claim 1, wherein the membership in the cluster may change as a result of the addition of a new server to the network.

4. The network of claim 3, wherein the new server may be a client that is converted into a server by adding a wired connection.

5. The network of claim 1, wherein the membership in the cluster may change as a result of the server selected by the client failing to provide adequate service.

6. The network of claim 1, wherein server capacity is optimized among the clusters.

7. The network of claim 1, wherein response delay experienced by the clients is minimized.

8. The network of claim 1, wherein cluster membership is elected to lead to more efficient utilization of network capacity.

9. The network of claim 1, wherein each server of a cluster is limited to a number of clients.

10. The network of claim 1, wherein each server can perform at least one of client authentication, billing, network monitoring, bandwidth provisioning and quality of service guarantee.

11. The network of claim 1, wherein cluster size of a server is determined by a capacity of the server.

12. The network of claim 1, wherein mobile clients can move from one cluster to another cluster.

13. The network of claim 1, wherein a new routing table is generated when a client changes cluster membership.

14. The network of claim 1, wherein new clusters may be created to enable the network to adjust to available backhaul.

15. The network of claim 1, further comprising:
   determining if there is a previous default gateway identified; and
   deleting the previous default gateway from memory.

16. A routed wireless network comprising:
   a plurality of wired access points;
   a plurality of clients, each client belonging to a cluster of clients administered by a single server and such that membership in a cluster is elected by the client through a selection of a beacon to rebroadcast;
   wherein the beacon broadcast by the server includes a hop-count set to zero;
   each client that receives the beacon rebroadcasting the beacon with the hop-count incremented by one;
   each client that receives the beacon rebroadcasting the beacon with an address of the client; and such that each client receiving the beacon knows a complete path to reach the server and the number of hops in the complete path to the server, and the beacon includes addresses of all of the clients included within the complete path to the server.

17. A routed network comprising:

a plurality of wired access points;

a plurality of clients, each client belonging to a cluster of clients administered by a single server and such that membership in a cluster is elected by the client through a selection of a beacon to rebroadcast;

wherein each client that receives the beacon rebroadcasting the beacon with an address of the client added to the beacon; such that each client receiving the beacon has a complete path to the server, and the beacon includes addresses of all of the clients included within the complete path to the server.

* * * * *